Oct. 20, 1953     R. B. CALMEYER     2,656,266
METHOD FOR REDUCING THE ACIDITY OF NITRIC ACID-CALCIUM
NITRATE COMPOSITIONS CONTAINING PHOSPHATE IONS
Filed March 15, 1949
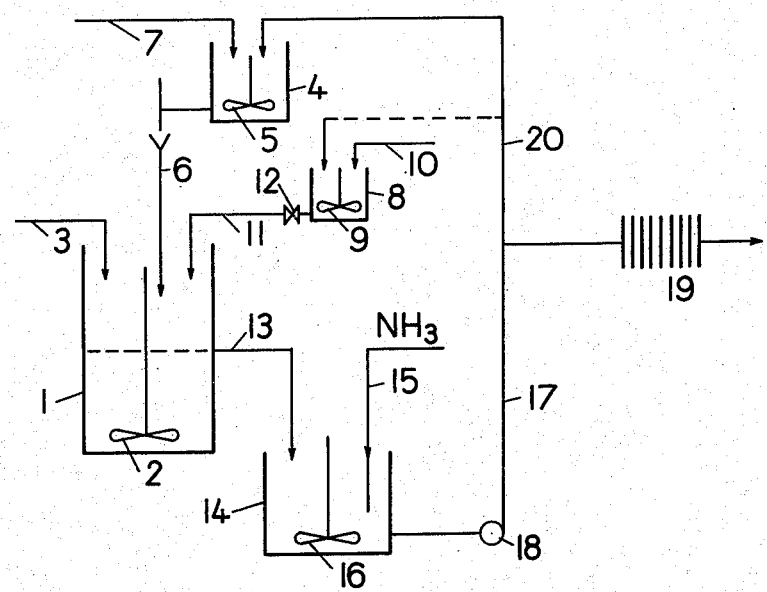
Inventor:
R. B. Calmeyer
By C. F. Wenderoth
Atty Patented Oct. 20, 1953

2,656,266

UNITED STATES PATENT OFFICE 2,656,266

METHOD FOR REDUCING THE ACIDITY OF NITRIC ACID-CALCIUM NITRATE COMPOSITIONS CONTAINING PHOSPHATE IONS

Reidar Bang Calmeyer, Heroya, near Porsgrunn, Norway, assignor to Norsk Hydro-Elektrisk Kvaelstofaktieselskab, Oslo, Norway Application March 15, 1949, Serial No. 81,544
In Norway March 15, 1948

5 Claims. (Cl. 71—43)

The present invention relates to a process for reducing the acidity of nitric acid-calcium nitrate composition containing phosphate ions obtained as a by-product by crystallization from the treatment of raw phosphate with nitric acid, by the controlled addition in a specified manner of both powdered calcium carbonate and a base such as calcium oxide, calcium hydroxide, ammonia, ammonium carbonate, or an alkali metal hydroxide to facilitate the removal of the phosphate ions by filtration of the precipitated calcium phosphates and to obtain a sufficiently high pH of about 4 or more in the so-treated product to facilitate its technical application in the phosphate iron-free form of calcium nitrate at a desired pH.

The crude nitric acid calcium nitrate composition containing phosphate ions, derived from the treatment of raw phosphate with nitric acid may be in the form of an aqueous solution or in heated melt form.

It has been heretofore proposed to dissolve the raw phosphate in nitric acid, whereafter calcium nitrate is crystallized from the acid liquors resulting in the process. After having added powdered calcium carbonate, calcium oxide, calcium hydroxide, ammonia or ammonia carbonate, the acid phosphate-ion-containing mass of calcium nitrate crystals is to be calcined.

It has, however, been found that by neutralizing the calcium nitrate crystals and entrained mother liquor with powdered calcium carbonate, calcium oxide or calcium hydroxide, that a sufficiently high pH is not obtained, to provide the technical result desired, and that the desired removal of phosphate ions is not obtained.

It has been discovered that when the calcium nitrate crystals are dissolved in water or melted, that the advantage is obtained of easily separating the precipitated products of the neutralization from the nitrate by filtration.

Dissolving the impure calcium nitrate crystals or melting them provides more favorable conditions for a far-reaching reduction of acidity, and practicable methods have been found for the treatment with calcium oxide and calcium hydroxide. If solid calcium compounds are used as alkalizing agents, the lime particles, which are used in an attempt to neutralize the contaminated nitrates, are covered with thin layers of calcium phosphates, so that the remaining agent on the inner side of this film is prevented from further neutralizing action. However, the dissolving of the alkalizing agent (calcium oxide or hydroxide) in calcium nitrate solution, free of phosphate ions, prior to the neutralization process, prevents the formation of calcium phosphate pellicles or films about the neutralization agent during the neutralization step.

When an attempt is made to neutralize the acid solution of calcium nitrate containing phosphate ions by means of calcium carbonate, which is the cheapest agent suitable, even under the most favorable conditions, a pH of about 4 is extremely difficult to obtain, in practice for the reasons given above.

The applicant has found that if the calcium nitrate and phosphate ion solution to be neutralized is free from fluorine compounds, of if its content of fluorine is less than about 0.3%, when the process is performed at a temperature of 50–80° C., which is usually the case, that the neutralization is brought to an end at a pH about 1.5 even if a very large excess of limestone is to be added.

For the purpose of obtaining a pH-value above 1.5 when using calcium carbonate as a neutralizing agent, according to the invention the following procedure is to be applied:

To a portion of the acid calcium nitrate solution to be neutralized containing phosphate ions and less than 0.3% of fluorine, a solution of a substance selected from the group consisting of calcium oxide, calcium hydroxide, alkali metal hydroxide and ammonium hydroxide is added, the latter in amounts sufficient to raise the pH to above 2.5 in said portion of the solution. To this pre-treated portion having a pH-value above 2.5 are thereupon simultaneously added the acid solution to be neutralized and calcium carbonate in finely divided form, the latter in amounts which are at least equivalent to the amounts of acid in said acid solution, whereby a pH=about 4 is obtained in the mixture of said solution and calcium carbonate.

The small quantity of basic hydroxide added appears to have the effect of "initiating" the process. Any addition of a basic hydroxide later during the neutralization, to keep the pH at the desired value, is therefore unnecessary.

The mother liquor from which the calcium nitrate is separated, may contain excess of nitric acid, and it may also be advisable to wash the calcium nitrate crystals with nitric acid. The acid solution of calcium nitrate may contain, therefore, relatively great amounts of nitric acid; the solution may, for instance, have a pH of approximately —1. In order to obtain satisfactory results in such cases it is not necessary to neutralize the solutions exclusively with the inorganic basic hydroxide up to a pH=above 2.5. The main part of the free acid may, namely in such cases be neutralized with powder of calcium carbonate to a pH-value between 0.5 and 1.0, e. g. 0. 9 before the solution of the inorganic basic hydroxide is added for the purpose of raising the pH further to above 2.5.

After neutralizing with calcium carbonate the pH can be increased further to a desired value by addition of ammonium hydroxide or some other basic hydroxide, whereafter the solution may be further worked up in known manner to give a calcium nitrate fertilizer.

The method pursuant to the invention can be performed continuously or discontinuously and in one or more steps.

To make it easier to understand the method pursuant to the invention it will be described below in connection with the accompanying drawing which shows diagrammatically and by way of example an arrangement of a plant putting the method into effect.

The drawing shows diagrammatically a plant for carrying out the method by neutralization of a solution with a low content of fluorine.

Acid (phosphate-ion-containing) solution of calcium nitrate is fed to a vessel 1, provided with a stirrer 2, in a constant stream through the conduit indicated at 3. At the same time there is passed to the vessel 1, through the conduit indicated at 6, from the vessel 4, a regulated current of suspended flour of limestone, in quantity sufficient to neutralize the solution in the vessel 1 to a pH=about 4. The vessel 4 is provided with a stirrer 5, and the flour of limestone is passed into it, as indicated at 7. By addition of a dissolved basic hydroxide from the vessel 8 e. g. burnt lime, dissolved in a solution of calcium nitrate, the pH in the vessel 1 is at the start or at an early stage in the neutralization process brought up to 3–3.5, whereupon this addition is stopped. The vessel 8 is provided with a stirrer 9, and the supply conduit for burnt lime to the vessel 8 is indicated at 10. The basic hydroxide is fed to the vessel 1 through a conduit 11, provided with a valve device 12. When to the solution in the vessel 1 a basic hydroxide is added at the start or at an early stage in the neutralization process, sufficient to bring the pH to 3–3.5, the neutralization will, by sufficiently long stay in the vessel 1, continue at a pH=3–4.

Through an overflow indicated by 13 the solution under treatment passes into the vessel 14, where it is after-neutralized with $NH_3$ to pH=about 6. The ammonia is added as indicated, at 15. When the solution has been neutralized for the second time, it is led through the conduit 17 by means of a pump 18 to the filtering plant, indicated at 19, and thence onwards for further processing in known manner, to calcium nitrate fertilizer.

As indicated at 20 the quantity of completely neutralized solution necessary for suspension of the flour of limestone or burnt lime is returned to the vessel 4, or alternatively to the vessel 8.

*Example*

Acid solution of calcium nitrate of the following content:

|  | Per cent |
|---|---|
| $Ca(NO_3)_2$ | 45 |
| Free $HNO_3$ | 3.4 |
| $P_2O_5$ | 0.6 |
| F | 0.12 |
| pH=approx. —1. | |

(measured with glass electrode) was neutralized with suspension of flour of limestone (containing about 700 gr. $CaCO_3$ per liter) at 80° C. in the following manner.

A continuous stream of lye of calcium nitrate and a continuous stream of flour of limestone suspension (in a quantity corresponding to an excess of about 5–10 gr. $CaCO_3$ per liter) was led to a precipitating vessel of such dimensions that the mixture was in the vessel for about 1 hour on an average.

The mixture adjusted itself to pH=0.9.

By addition of a suitable quantity of dissolved $Ca(OH)_2$ the pH was raised to about 3.5.

Without further addition of $Ca(OH)_2$ the continuous neutralization of further quantities of acid calcium nitrate solution with flour of limestone suspension then continued at pH=3.0–3.5.

By analysis of the neutralization product thus obtained there was found:

Excess of flour of limestone about 8 gr. $CACO_3$ per liter.

Precipitated:
About 95% of the F-content
About 100% of the $P_2O_5$ content

The solution was finally after-neutralized with $NH_3$-gas to pH=6 and thereupon filtered.

I claim:

1. A process for reducing the acidity of a nitric acid-calcium-nitrate composition in dissolved form containing phosphate ions and up to 0.3% of fluoride ions with calcium carbonate comprising the steps of treating a first portion of said nitric acid calcium nitrate composition with an aqueous solution of a base selected from the group consisting of calcium oxide, calcium hydroxide, alkali metal hydroxide, ammonium hydroxide and ammonium carbonate to obtain thereby a pH value above 2.5 and short of neutralization and thereafter simultaneously adding to said first treated portion additional quantities of said nitric acid-calcium nitrate composition together with finely divided calcium carbonate, said calcium carbonate being added in amounts at least equivalent to the acid in said added nitric acid-calcium nitrate composition, to obtain thereby a resulting pH value between 3 and 4, without the further addition of a basic hydroxide.

2. A process as in claim 1 wherein the nitric acid-calcium nitrate composition is in the form of a melt.

3. A process for reducing the acidity of a nitric acid-calcium nitrate solution having a pH less than 1.5 containing phosphate ions and up to 0.3% fluoride ions with calcium carbonate, comprising the steps of treating a first portion of said nitric-acid-calcium nitrate solution with finely divided calcium carbonate to a pH value of 1.5, thereafter adding to the so-treated first portion an aqueous solution of a base selected from the group consisting of calcium oxide, calcium hydroxide, alkali metal hydroxide, ammonium hydroxide and ammonium carbonate to a pH value above 2.5 and short of neutralization, and thereafter simultaneously adding thereto, additional quantities of the nitric acid-calcium nitrate solution and finely divided calcium carbonate, said calcium carbonate added in an amount at least equivalent to the acid in the additional nitric acid-calcium nitrate solution to obtain a pH value of between about 3 to about 4, without further addition of a basic hydroxide.

4. A continuous process for reducing the acidity of a nitric acid-calcium nitrate solution containing phosphate ions and up to 0.3% fluoride ions with calcium carbonate, comprising adding an aqueous solution of a base selected from the group consisting of calcium oxide, calcium hydroxide, alkali metal hydroxide, ammonium hydroxide and ammonium carbonate to a first portion of said nitric-acid-calcium nitrate solution to obtain a pH value in the first treated portion of about 2.5 to about 4.0, thereafter simultaneously adding to said first treated portion additional quantities of nitric-acid-calcium nitrate solution and finely divided calcium carbonate, said calcium carbonate added in an amount at least equivalent to the acid in said additional nitric acid-calcium nitrate solution to provide a pH of about 3 to about 4, without the further addition of a basic hydroxide, transferring the mixture to another vessel provided with a stirrer, adding ammonia to the stirred mixture to a pH of about 6, and filtering the solution to remove the solids precipitated therein.

5. A process as in claim 4 wherein the nitric acid-calcium nitrate solution to which the aqueous solution of a base is added, has a pH of less than 1.5 and is adjusted to a pH value of about 1.5 by the addition of finely divided calcium carbonate before the aqueous solution of a base is added to raise the pH in said first treated portion from about 2.5 to about 4.0.

REIDAR BANG CALMEYER.

References Cited in the file of this patent

UNITED STATES PATENTS

| Number | Name | Date |
|---|---|---|
| 1,816,285 | Johnson | July 28, 1931 |
| 1,849,704 | Boller | Mar. 15, 1932 |
| 1,856,187 | Johnson | May 3, 1932 |
| 1,893,946 | Kaselitz | Jan. 10, 1933 |
| 1,903,684 | Palazzo | Apr. 11, 1933 |

FOREIGN PATENTS

| Number | Country | Date |
|---|---|---|
| 14,194 | Great Britain | 1903 |
| 308,726 | Great Britain | Mar. 25, 1929 |
| 484,037 | Great Britain | Apr. 29, 1938 |